United States Patent [19]

DeCoene

[11] 4,275,552
[45] Jun. 30, 1981

[54] HAYMAKING MACHINE

[75] Inventor: Frans J. G. C. DeCoene, Zedelgem, Belgium

[73] Assignee: Sperry Corporation, New Holland, Pa.

[21] Appl. No.: 108,322

[22] Filed: Dec. 31, 1979

[30] Foreign Application Priority Data

Jan. 9, 1979 [GB] United Kingdom ............... 00747/79
Jun. 5, 1979 [GB] United Kingdom ............... 19517/79

[51] Int. Cl.³ ..................... A01D 78/12; A01D 57/12
[52] U.S. Cl. .......................................... 56/370; 56/368
[58] Field of Search ........................... 56/363, 365, 370

[56] References Cited

U.S. PATENT DOCUMENTS

| 3,896,613 | 7/1975 | van der Lely | 56/370 |
| 4,157,644 | 6/1979 | van der Lely | 56/370 |

FOREIGN PATENT DOCUMENTS

| 286016 | 11/1970 | Austria | 56/370 |
| 2302022 | 9/1976 | France | 56/370 |
| 519793 | 4/1940 | United Kingdom | 56/370 |
| 1200268 | 7/1970 | United Kingdom | 56/370 |
| 1444284 | 7/1976 | United Kingdom | 56/370 |
| 2022387 | 12/1979 | United Kingdom | 56/370 |

Primary Examiner—Paul J. Hirsch
Attorney, Agent, or Firm—Larry W. Miller; Frank A. Seemar; James R. Bell

[57] ABSTRACT

A haymaking machine comprising at least one rotatably mounted rotor assembly a plurality of tine assemblies pivotally mounted on the rotor assembly eccentrically of the rotational axis thereof, linkage means coaxially mounted at one end on the tine assemblies and pivotable relative thereto, and to the rotor assembly, actuation means on the rotor assembly, and connecting means extending between the actuation means and the linkage means, the linkage means being connectible in at least one operating condition to the tine assemblies so as to be movable in unison therewith, the arrangement being such that in that operating condition the actuation means cause the tine assemblies to pivot from extended, crop-engaging positions to retracted, crop-releasing positions and vice versa.

29 Claims, 15 Drawing Figures

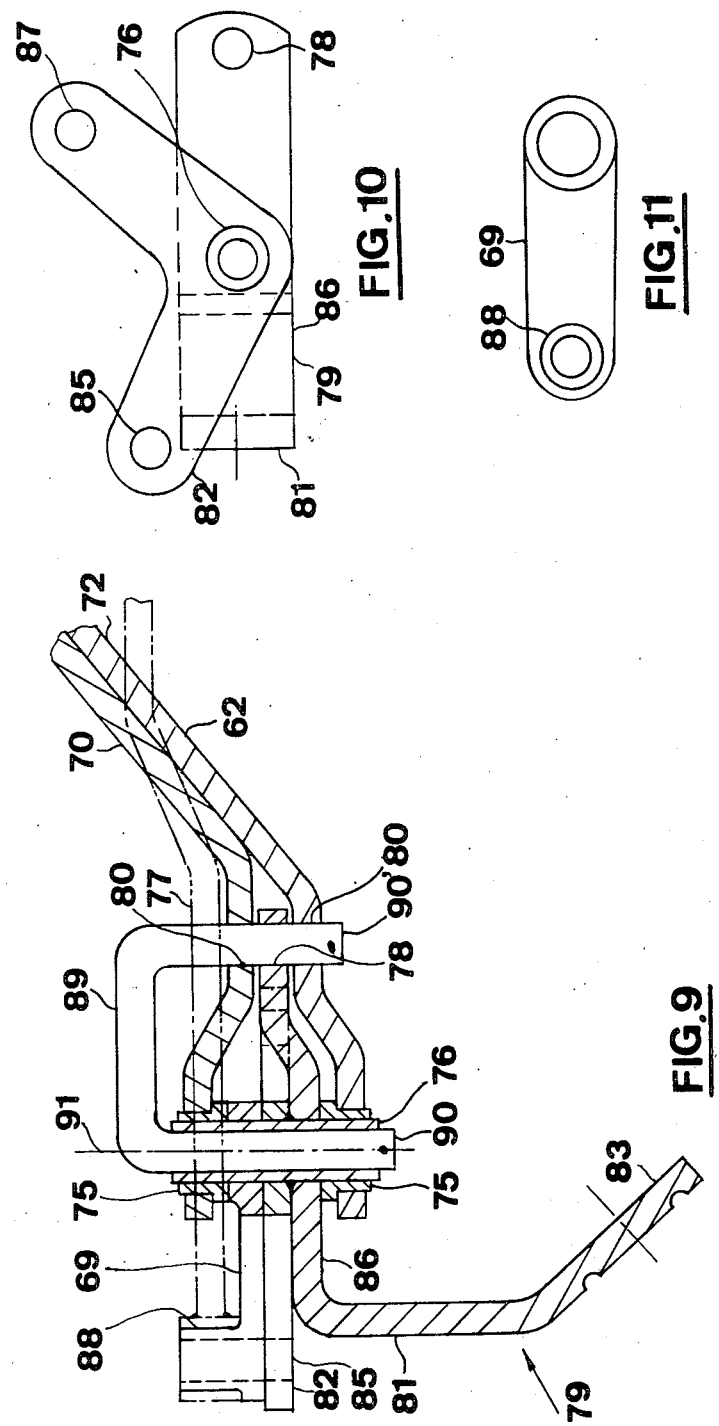

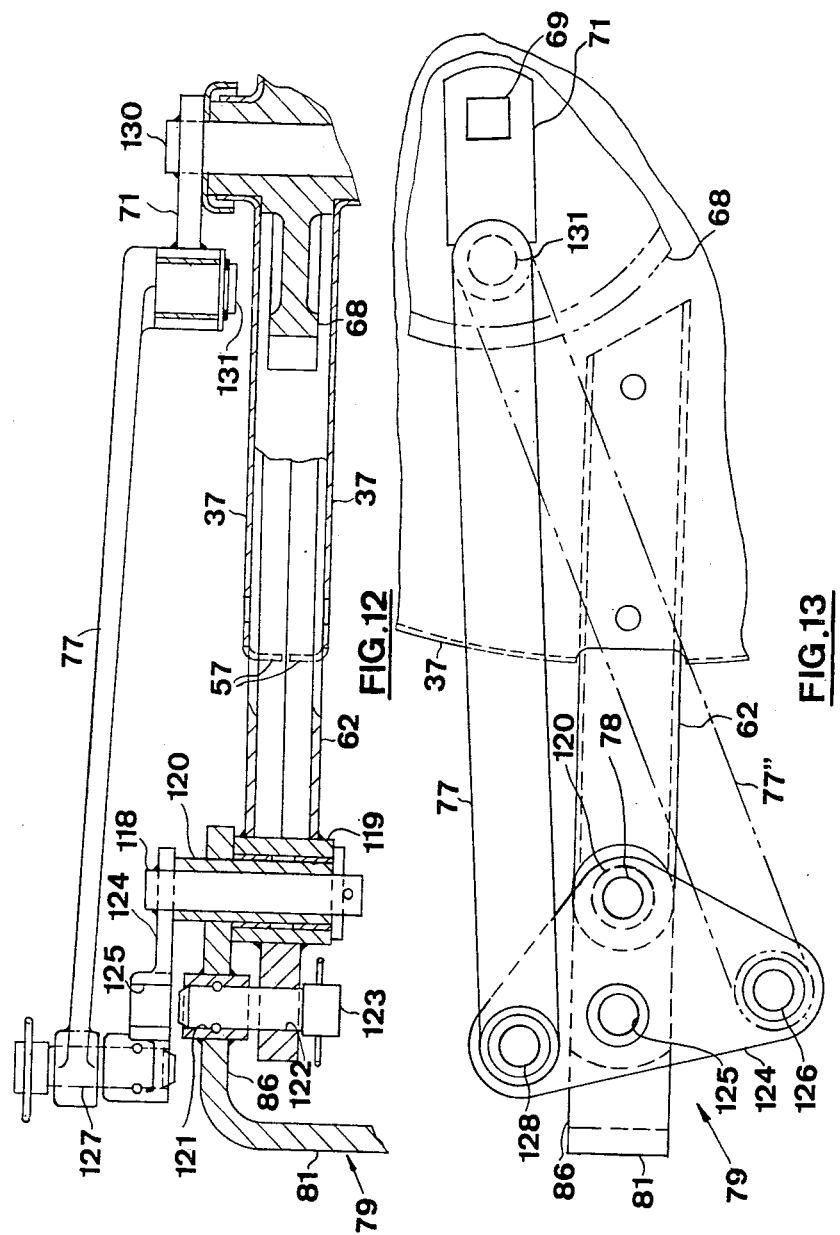

HAYMAKING MACHINE

BACKGROUND OF THE INVENTION

1. Field of the Invention

The present invention relates to haymaking machines for tedding and windrowing crop material such as hay. More precisely, the invention is concerned with haymaking machines of the type comprising one or more rotors which are rotatably mounted about generally upright axes and which are provided with a plurality of crop working elements in the form of flexible tines.

2. Description of the Prior Art

In the haymaking process, crop material usually has to be turned or tedded once or more for proper drying after it has been cut with either a mower or mower-conditioner. Also, prior to being baled, dried crop material has to be raked together in windrows. Single purpose tedding and raking machines are generally known in the art and usually are capable of doing an excellent job. However, single purpose machines have an important drawback in as much as to make good quality hay, two different types of such machines are required, namely a tedder and a rake. Obviously this can make haymaking more expensive and frequent interchange between tractor-mounted machines may be necessary.

Combined machines capable of both raking and tedding crop material (hereinafter called "rake tedders") have gained acceptance mainly as an economical means for accomplishing both jobs. This is especially true in the more humid European countries where hay must be turned and moved more frequently for proper drying. Oner particular type of rake-tedder is the "cam-actuated" type in which a cam is used in conjunction with a follower to actuate a plurality of equally spaced time bars that extend radially outwardly from a rotor. As the tine bars cycle with the rotor, the cam follower engages the cam and cause the tine bars to rotate about their axes, causing the tines which extend from the outer ends of the tine bars gradually to move from a crop-engaging position to a raised, crop-releasing position. The cam may have such a profile and be made adjustable that either raking or tedding may be accomplished. The cam is made adjustable so that the position at which the tines release the crop is variable relative to the rotors and direction of travel of the rake-tedder.

In performing the raking operation the tines sweep an entire swath of crop material into a windrow and then rise, so releasing the crop which is thus deposited in a narrow windrow extending between two laterally spaced rotors. For the tedding operation, the cam is adjusted such that the tines engage the crop material and sweep it outwardly from the centre of the machine spreading it over about the same width as the original swath. In using a double rotor rake-tedder for raking it has been found that a slower rotational speed must be used so as to form an acceptable windrow. Thus to optimise the efficiency of the rake-tedder, it is desirable to provide it with a two-speed input drive means, one input drive being slower than the other to accommodate raking, whilst the faster speed is employed for tedding. Usually, machines of this type accomplish excellent windrowing but leave room for improvement as regards tedding.

For tedding, it is desirable to obtain a much more vigorous action of the tines on the crop material than is the case for windrowing. This is partially obtained with the machine described above by rotating the rotors at a higher speed. In addition, it is desirable to arrange for the tines not to retract from the crop material during operation.

In another prior art machine, this same result is obtained by withdrawing the cam follower from the cam firmly securing the tine bars to the rotor framework, whereby the tine bars are no longer rotated about their longitudinal axes. A drawback of this arrangement is that the tine bars individually must be brought into the tedding position and immobilised in this position. This is time-consuming and it may happen that the operator forgets to reposition and immobilize one or more tine bars which results in the machine malfunctioning. Furthermore, the tines which are left rotating may hit other tines thus causing damage to the machine. Also this repositioning of the tine bars from the tedding position into the windrowing position and vice versa necessitates delicate adjustments.

In another prior art machine of the type described above, the cam follower is urged against the cam by spring means. The tine bars can be brought from the windrowing position into the tedding position by a downward shifting of the cam until the cam follower is out of engagement with the cam. An important drawback with this machine is that in order to bring the machine from the windrowing position to the tedding position and vice versa, it is necessary for the cam to be moved axially along a central shaft. This is disadvantageous because the position of the cam and its rigidity in relation to its support axis determine the trajectory described by the tines during windrowing, and thus the quality of the windrowing performance. Furthermore, the spring means which urge the cam follower into engagement with the cam are continuously stretched and released during operation. This may result in a rapid fatigue of the spring means followed by an appreciable reduction of the quality of machine performance, particularly during the tedding operation when the crop material to be displaced is green and heavy. Also, premature breakdowns may occur.

In all of the above described prior art arrangements the cam follower is in the form of a roller rotatably mounted on a tine bar via crank means. In practice it has been experienced that these cam rollers are fast wearing components which are difficult to design for a longer life without making the cost of manufacture prohibitive. This is a problem which is inherent to the principle of camactuated tine bars since the cam follower is moved up-and-down once per cycle of the rotor and as the latter has to be rotated at a relatively high speed, the cam follower is moved up-and-down very abruptly at a correspondingly high frequency. This results not only in considerable vibration but also in constant movement relative to the cam.

Other machines have been conceived wherein the tines are pivotably mounted on the rotors and are arranged to move radially outwardly against spring forces under the influence of centrifugal forces. Rake-tedders of this type unquestionably have better tedding characteristics but the windrowing characteristics are less satisfactory. When changing over from the tedding condition to a windrowing condition, the tines must still be adjusted individually and in addition to that, windrow deflectors must be brought into position. Apart from the foregoing drawbacks this type of rake-tedder is simple in design.

Other rake-tedders have been conceived with a view to providing universal machines having both excellent tedding and raking characteristics. Such machines have turned out to be very complicated in design and difficult to adjust. Furthermore such machines usually are relatively expensive.

SUMMARY OF THE INVENTION

It is the object of the present invention to overcome or to attenuate one or more of the foregoing disadvantages and drawbacks of rotor type rake-tedders. More precisely it is the object of the present invention to provide a universal machine with a minimum of components and which is capable of performing all haymaking operations between the mowing and baling operations.

According to the present invention, a haymaking machine comprises at least one rotatably mounted rotor assembly, a plurality of tine assemblies pivotally mounted on the or each rotor assembly eccentrically of the rotational axis thereof, linkage means mounted at one end coaxially with the tine assemblies and pivotable relative to the tine assemblies and to the rotor assembly, actuation means on the or each rotor assembly, and connecting means extending between the actuation means and the linkage means, the linkage means being connectible in at least one operating condition to the tine assemblies so as to be movable in unison therewith and the arrangement being such that in that operating condition the actuation means cause the tine assemblies to pivot from extended, crop-engaging positions to retracted, crop-releasing positions and vice versa.

Preferably one or more pairs of such rotor assemblies are provided, the rotor assemblies of the or each pair being rotatably in opposite directions. The machine may comprise drive reversing means for reversing the drive direction of one rotor assembly of the or each pair of assemblies so that both assemblies of the or each pair may be rotated in one and the same direction.

The actuation means may be in the form of central gear means mounted coaxially with the or each rotor assembly and which in operation remains stationary, and a plurality of planetary gears rotatably mounted on the rotor assembly in mesh with the central gear means and which are rotatable in unison with the rotor assembly. In a preferred embodiment, the actuation means comprise a disc mounted eccentrically of the rotational axis of the associated rotor assembly, and a control ring mounted for rotational movement relative to, and around the periphery of, the disc. The connecting means may be formed by connecting rods pivotally coupled at one of their ends to the planetary gears or control ring eccentrically thereof, and at their opposite ends to the linkage means.

The central gear means and eccentric disc are each preferably angularly adjustable with respect to the axis of the associated rotor assembly, and latch means may be provided to latch the central gear or eccentric disc in a selected position.

Each time assembly preferably comprises a tine carrier pivotally mounted on the associated rotor assembly coaxially with the pivotal mounting of the associated linkage means. Each tine carrier supports adjacent a lower end tine means and is made pivotable relative to the associated linkage means in one operating condition, and may be coupled thereto in another operating condition for which purpose latch means are provided. Each tine carrier can be latched to the associated linkage means in at least one position. However, preferably, the tine carriers can be coupled to the associated linkage means in at least two angularly offset positions on at least one rotor assembly of the or each pair of rotor assemblies. The tine carriers can also be disconnected from the associated linkage means and be fixedly coupled to the associated rotor assembly so that in operation the tine carriers assume a fixed position relative to the rotor assembly and the linkage means are pivotable relative to the associated tine carriers.

BRIEF DESCRIPTION OF THE DRAWINGS

Rake-tedders constructed in accordance with the present invention will now be described in greater detail, by way of example, with reference to the accompanying drawings, in which:

FIG. 9 shows, to a larger scale, the portion of FIG. 2 indicated at IX, FIGS. 10 and 11 are top views of different components of FIG. 9, FIG. 12 is a partial cross-sectional view of a rotor assembly of another embodiment, FIG. 13 is a top view of FIG. 12.

DETAILED DESCRIPTION OF THE PREFERRED EMBODIMENT

In the following description, right-hand and left-hand references are determined by standing at the rear of the machine and facing in the direction of forward travel which is indicated at 18 in FIG. 1. Also, in the following description, it is to be understood that such terms as "forward", "rearward", "right", "upwardly" and "downwardly" are words of convenience and are not to be construed as limiting terms.

Figure 1:
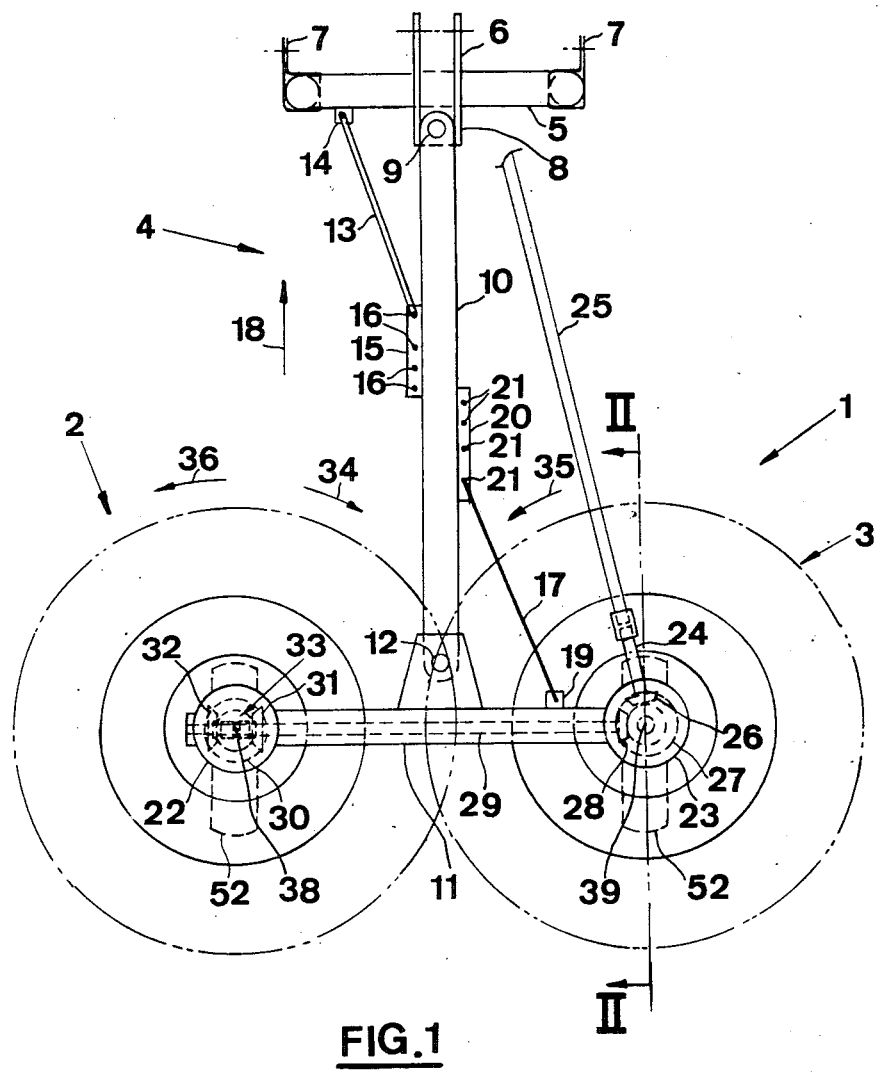
FIG. 1 is a schamatic top view of one rake-tedder.
Figure 2:
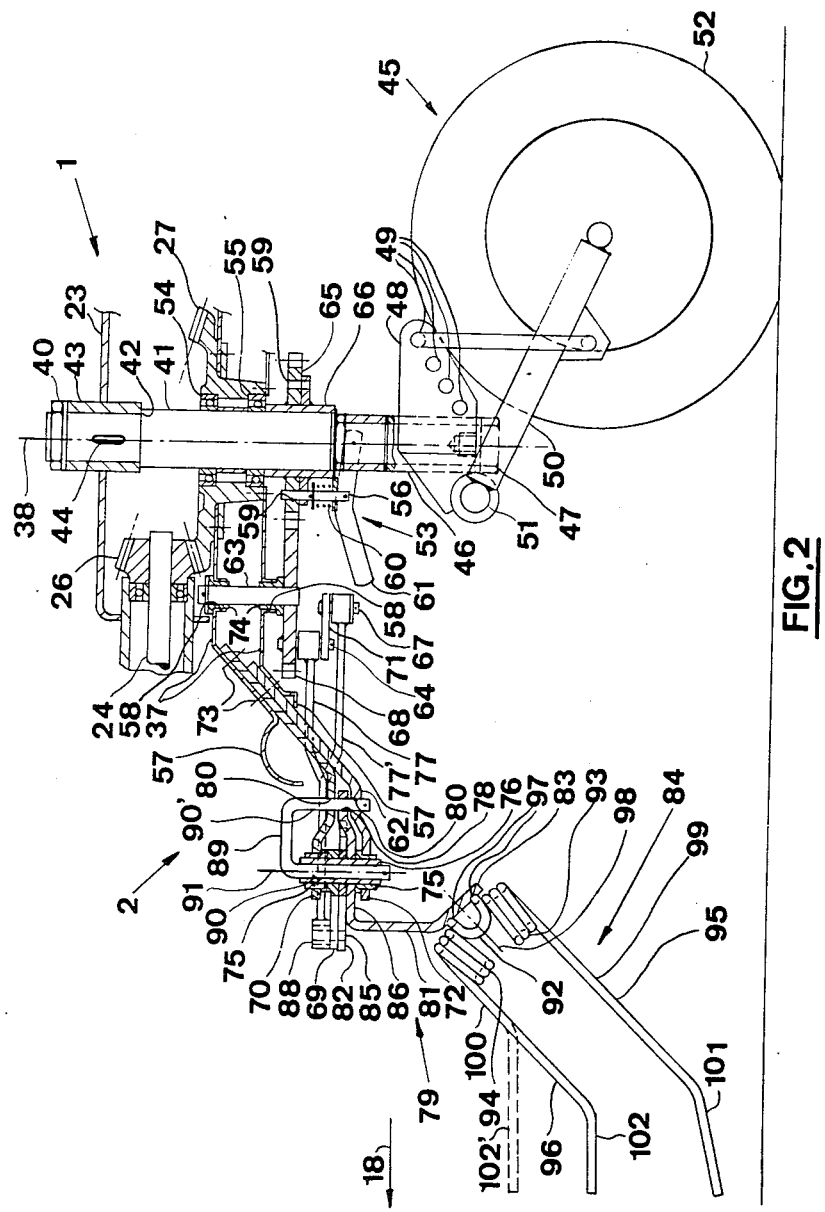
FIG. 2 is a partial sectional view, to a larger scale, taken along the line II–II in FIG. 1.
Figure 3:
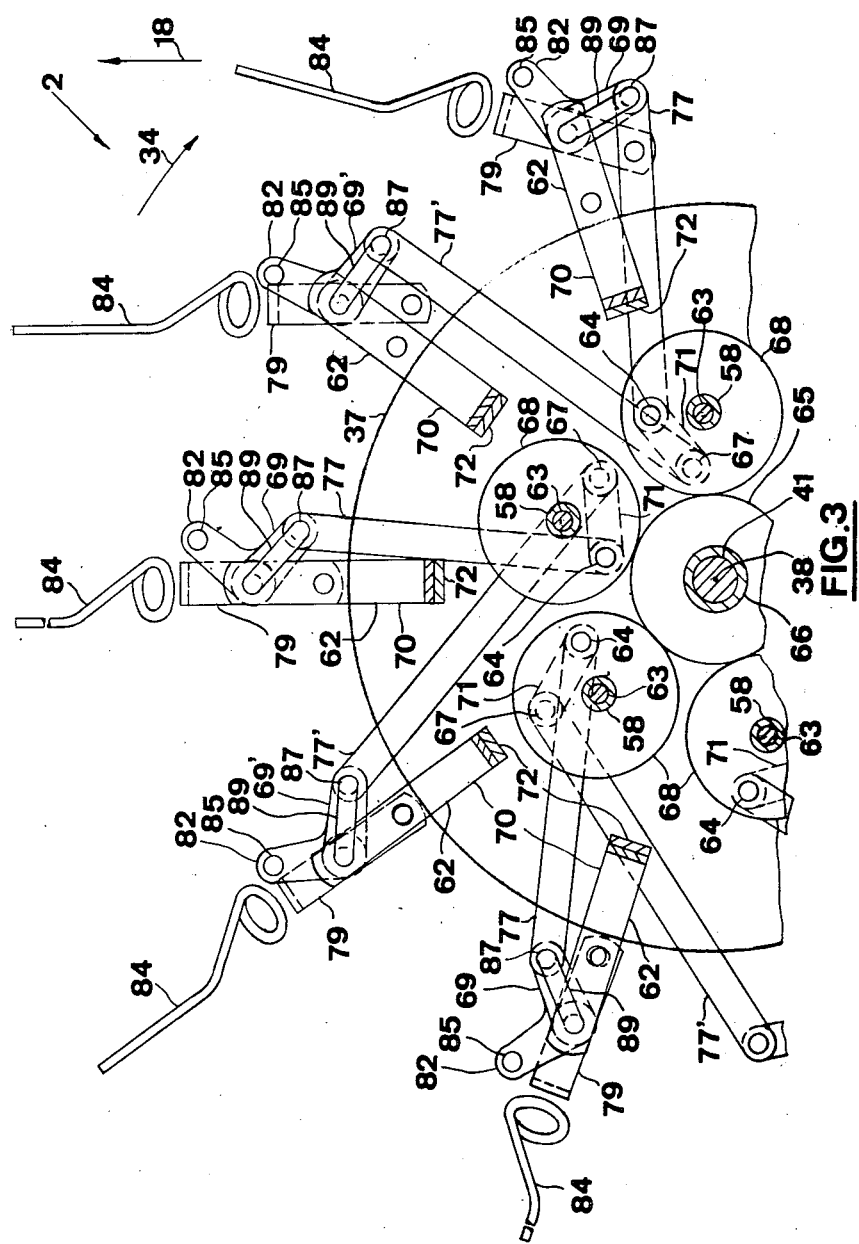
FIG. 3 is a partial top view of a left-hand rotor assembly of the rake-tedder shown in FIG. 1, illustrating the rotor assembly in one characterising operating condition.

With particular reference to FIGS. 1 and 2, the rake-tedder 1 comprises a pair of rotor assemblies 2 and 3 which are wheel-supported (FIG. 2) and are pulled through the field by a hitch frame structure indicated generally at 4 and adapted for connection to a conventional three point tractor hitch (not shown).

The front portion of the hitch frame structure 4 comprises a generally U-shaped yoke 5 having a top hitch assembly 6 adapted to connect to an upper centre link (not shown) of the three point tractor attachment. Pivotally secured to the lower outside ends of the yoke 5 is a pair of links 7 which connect the yoke 5 with the lower outside links (not shown) of the three point tractor attachment.

Support means 8 on the yoke 5 are adapted to receive a pivot 9 which connects a main base 10 of the hitch frame 4 with the yoke 5. The main beam 10 extends rearwardly where it joins a transverse beam 11 via a further pivot 12. The further pivot 12 is positioned generally intermediate the ends of the transverse beam 11. To position and control the lateral movement of the present rake-tedder a lateral positioning link 13 is mounted between the left-hand side of the yoke 5 and an intermediate point on the main beam 10. More particularly, the front end of the lateral positioning link 13 is pivotaly secured to a bracket 14 which is mounted on the left-hand side of the yoke 5. The rearmost end of the lateral positioning link 13 is provided for locking the main beam 10 in one of a number of angular positions by means of the bracket 15. To this end, the bracket 15 has a number of locking holes 16. The forwardmost hole 16 is employed to lock the main beam 10 in the transport position such that the rake-tedding device is generally centred behind the tractor and the hitch frame structure 4. The other locking holes 16 are provided for locking the main beam 10 such that the rake-tedding device is positioned in an offset relationship to the tractor.

Mounted between the main beam 10 and the transverse beam 11 is another positioning link 17 for angularly positioning the transverse beam relative to the forward direction of operative travel 18. This link 17 is pivotaly secured to the bracket 19 on the transverse beam 11 and can be hooked at its forward end in a number of positions to the bracket 20 on the main beam 10. To this end, the bracket 20 comprises a number of locking holes 21 adapted to receive the hooked forward end of the link 17.

Mounted on opposite ends of the transverse beam 11 and extending outwardly therefrom are left-hand and right-hand gear housings indicated at 22, 23, respectively. The right-hand gear housing 23 comprises an input drive shaft 24 which receives motive power from the tractor PTO (not shown) via a conventional universal joint shaft 25. The input shaft 24 comprises a pinion 26 which is adapted to mesh with a ring gear 27 of the right-hand rotor assembly 3. The ring gear 27 in turn drives a pinion 28 fixed to the right-hand end of a transversely-extending drive shaft 29 rotatably mounted within the transverse beam 11. The motion transmitted to the drive shaft 29 is further transmitted to a ring gear 30 of the left-hand rotor assembly 2 by two pinions 31 and 32. The left-hand gear housing 22 comprises a drive reversing mechanism 33 of which the pinions 31 and 32 form part. As drive reversing mechanisms are generally known in the art, and as drive reversing mechanisms applied on one rotor assembly of a twin rotor rake-tedder are also known in the art, the drive reversing mechanism 33 is shown only schematically in FIG. 1 and will not be described in any further detail. It will be sufficient here to note that in one position the rotor assembly 2 is rotatable in the direction 34 opposite to the drive direction 35 of the rotor assembly 3, whilst in another position the rotor assembly 2 is rotatable in the direction 36 which corresponds to the drive direction 35 of the right hand rotor assembly 3. The drive reversing mechanism 33 may be shifted from one position to another through a handle (not shown) provided on the gear housing 22.

The ring gears 27 and 30 are mounted on the carrier plates 37 of the respective rotary units 2 and 3 in a manner so as to be rotatable about substantially upright axes 38 and 39. Basically the left- and right-hand side rotor assemblies 2 and 3 are of identical construction except for the fact that the right-hand gear housing 23 comprises the input drive shaft 24 and the left-hand gear housing 22 comprises the drive reversing mechanism 33. Also certain components of the left-hand rotor assembly have an additional adjustment possibility compared to the corresponding components of the right-hand side rotor assembly 3. However, this will be described in detail hereinafter.

With particular attention now directed to FIG. 2, the right-hand rotor assembly 3 is shown therein. The gear housing 23 has fixed thereto, by a nut 40, a support shaft 41 which extends downwardly therefrom and generally coincides with the right-hand upright axis 39. The support shaft 41 comprises a shoulder 42 which abuts the underside of a bush 43 welded to the gear housing 23. The nut 40 abuts the bush 43 from above and a key 44 prevents the shaft 41 from rotating in the bush 43.

Rotatably mounted on the bottom end of the shaft 41 is a wheel assembly 45 which includes a bush 46 held in position on the shaft 41 by a bolt assembly 47. Welded to the bush 46 is a mounting piece 48 formed with a series of apertures 49 for locking a wheel arm 50 in any of a number of selected positions for adjustment of the height of the rotor assembly. When adjusting the height of the rotor assembly, the wheel arm 50 pivots about a transverse axis 51. Rotatably mounted about the lower end of the wheel arm 50 is a wheel 52.

The ring gear 27, to which the carrier plates 37 are firmly attached, is rotatably mounted on the support shaft 41 via a pair of roller bearings 54 and 55. The carrier plates 37 are annular in shape and are formed of sheet metal with turned over edges 57 for strength and apertures 58 punched therein. Outwardly extending arms 62 are secured to the rotor assemblies 2 and 3 between the carrier plates 37 and support at their outer ends rake tine structures 84 which will be described hereinafter.

A central gear 65 is welded or otherwise secured to a bush 66 which itself is rotatably mounted on the support shaft 41. Latch means 53, comprising a latch pin 56, engage a hole 59 in the central gear 65 in a manner so as to prevent any rotational movement of the central gear 65 about the support shaft 41 during normal operation. The latch pin 56 is spring loaded by spring means 60 operable to urge the pin into latching engagement with the central gear 65. The latch pin 56 is pivotally mounted at one end to a handle 61, which itself is pivotally mounted on the support shaft 41 and by which it becomes possible to retract the latch pin 56 from its latching position, whereafter angular adjustment of the central gear 65 is possible.

A plurality of planetary gears 68 is rotatably mounted below the carrier plates 37 in mesh with the associated central gear 65. The gears 68 have exactly the same number of gear teeth as the central gear 65. Also, there are only half as many planetary gears 68 as there are arms 62. In the embodiment, shown in FIGS. 2 to 8, ten arms 62 are provided per rotor assembly which means that five planetary gears 68 are provided.

The gears 68 are rotatably supported on the carrier plates 37 via stub shafts 63 which are rotatable in bearing bushes 74 which are a press fit in the punched apertures 58 in the carrier plates. Each gear 68 supports eccentrically thereof a further stub shaft 64 to the free end of which a crank 71 is attached. This crank 71 in turn supports adjacent its free end a third stud shaft 67. The angular position of the stub shafts 64 and 67 relative to each other and relative to the centre of the associated gear 68 depends on the number of planetary gears 68 provided on each rotor assembly. In the case of five planetary gears 68 the angular relationship is about 90° (or slightly less).

Connecting rods 77 are pivotally mounted at one end on the respective stub shafts 64 and also extend generally outwardly towards the vicinity of the extreme outer ends of the arms 62, at which location they are pivotally coupled to linkages 69 (FIGS. 2, 9 and 11). Additional connecting rods 77' extend between the third stub shafts 67 on the one hand and further linkages 69' on the other hand.

It will be appreciated from the drawings that a pair of arms 62 is associated with each planetary gear 68 and that both arms of each pair of arms 62 are disposed on the same side of the associated gears. The connecting rod 77 associated with each of the planetary gears 68 is directed to the vicinity of the outer end of the one arm 62 of the pair of arms which is the closest to the associated planetary gear 68, whilst the other connecting rod 77' is directed to the vicinity of the outer end of the other arm 62 of that pair and which is angularly disposed furthest away from the associated gear. Also, as is apparent from the drawings, the connecting rods 77 and 77' are different in shape and length. It should also be noted that the planetary gears 68, arms 62 and connecting rods 77 and 77' are so disposed relative to each other that during operation, the connecting rods 77 and 77' continuously remain positioned between adjacent arms 62 without contacting them.

The arms 62 which are attached to the carrier plates 37 and which extend radially outwardly, when seen in top view, comprise an upper and a lower member 70, 72, respectively, which at their inwardly facing ends contact each other and are clamped together between both carrier plates 37 by means of bolts and nuts 73. At their opposite ends, the arm members 70, 72 are spaced apart and comprise aligned apertures in which bearing bushes 75 are pressed (best shown in FIG. 9).

Rotatably supported in the bushes 75 are hollow shafts 76 to which tine carriers 79 are welded or otherwise firmly secured. All tine carriers 79 have a generally downwardly projecting leg 81 connected at their upper ends to substantially horizontal portions 86 and supporting at their lower ends angled portions 83 (FIG. 9). The angled portions 83 define an angle of about 45° to the vertical. Attached to these angled portions 83 are the rake tine structures 84.

As shown in FIGS. 9 and 10, for example, the horizontal portion 86 of each tine carrier 79 is extended at the side of the hollow shaft 76 opposite to the side at which the leg 81 is provided and comprises, adjacent its end, an aperture 78, which can be aligned with further apertures 80 in the arm members 70 and 72. Welded or otherwise firmly secured to the tine carriers 79 are angled members 82 which comprise angularly offset apertures 85 and 87. The apertures 85 and 87 are angularly offset relative to each other and relative to the pivot axis of the tine carriers 79 by an angle of about 90° (or slightly more). The apertures 85 and 87 are further also angularly offset relative to the apertures 78 in the extensions of the horizontal tine carrier portions 86. Finally, all the apertures 85, 87, 78 and 80 are provided at the same distance from the pivotal mounting of the tine carriers 79. The angled members 82 may be the same on both rotor assemblies 2 and 3 for the sake of standardisation of components. However, and as will become apparent, in the right-hand rotor assembly 3 only the apertures 87 in any of the angular members 82 are really required and thus the apertures 85 may be omitted, whereby the angular members 82 in the right-hand rotor assembly 3 may be replaced by straight extensions comprising only the apertures 87.

Each linkage 69 (best shown in FIGS. 9 and 11) is pivotally mounted at one end of the hollow shaft 76 and comprises at its other end a bush 88, the aperture of which can be aligned with either of the apertures 85 and 87 and to which one end of the associated connecting rod 77 or 77' is pivotally connected.

A latch member 89, comprising a first and longer leg 90 and a second and shorter leg 90', is pivotally mounted on each arm 62 with its longer leg coaxial with the hollow shaft 76 of the associated tine carrier 79, and is arranged such that the other and shorter leg 90' can be inserteed in any of the apertures 78, 80, 85, 87 and the bush 88. The arrangement is further such that when the shorter leg 90' is inserted in the apertures 80 of the associated arm members 70, 72 on the one hand and the aperture 78 in the extension of the horizontal portion 86 of the associated tine carrier 79 on the other hand, the tine carrier 79 assumes an angularly fixed position relative to the associated arm 62 on the rotor assemblies 2 and 3. If, instead, the shorter leg 90' is inserted on the one hand in the bush 88 of the linkage 69 and on the other hand in either of the apertures 85 and 87 of the associated angled member 82, then the associated tine carrier 79 is motion controlled.

To change the latch members 89 from one position to another, it is sufficient to lift them to an extent that only the shorter legs 90' are free to swing, with the longer legs 90 thus till at least partially inserted in the respective hollow shafts 76. It will also be appreciated that under all circumstances the connecting rod 77 and 77' remain pivotally coupled to the bushes 88 on the associated linkages 69, 69' and that these linkages will swing about pivot axes 91 without affecting the angular position of the tine carriers 79 in the event that the latter are latched in fixed positions relative to the rotor arms 62.

Returning to the rake tine structures 84, it will be seen that each tine carrier 79 supports a tine assembly composed basically of a central mounting portion 92, a pair of oppositely wound and oppositely directed spring coils 93, 94 and a pair of spring tines 95, 96. The lower ends 83 of the tine carriers 79 comprise a pair of recesses 97, as can be seen in FIG. 2, to receive sections of the spring wire therein and thus prevent pivoting of the tine assembly around the mounting pins which are shown schematically at 98 in FIG. 2.

Figure 4:
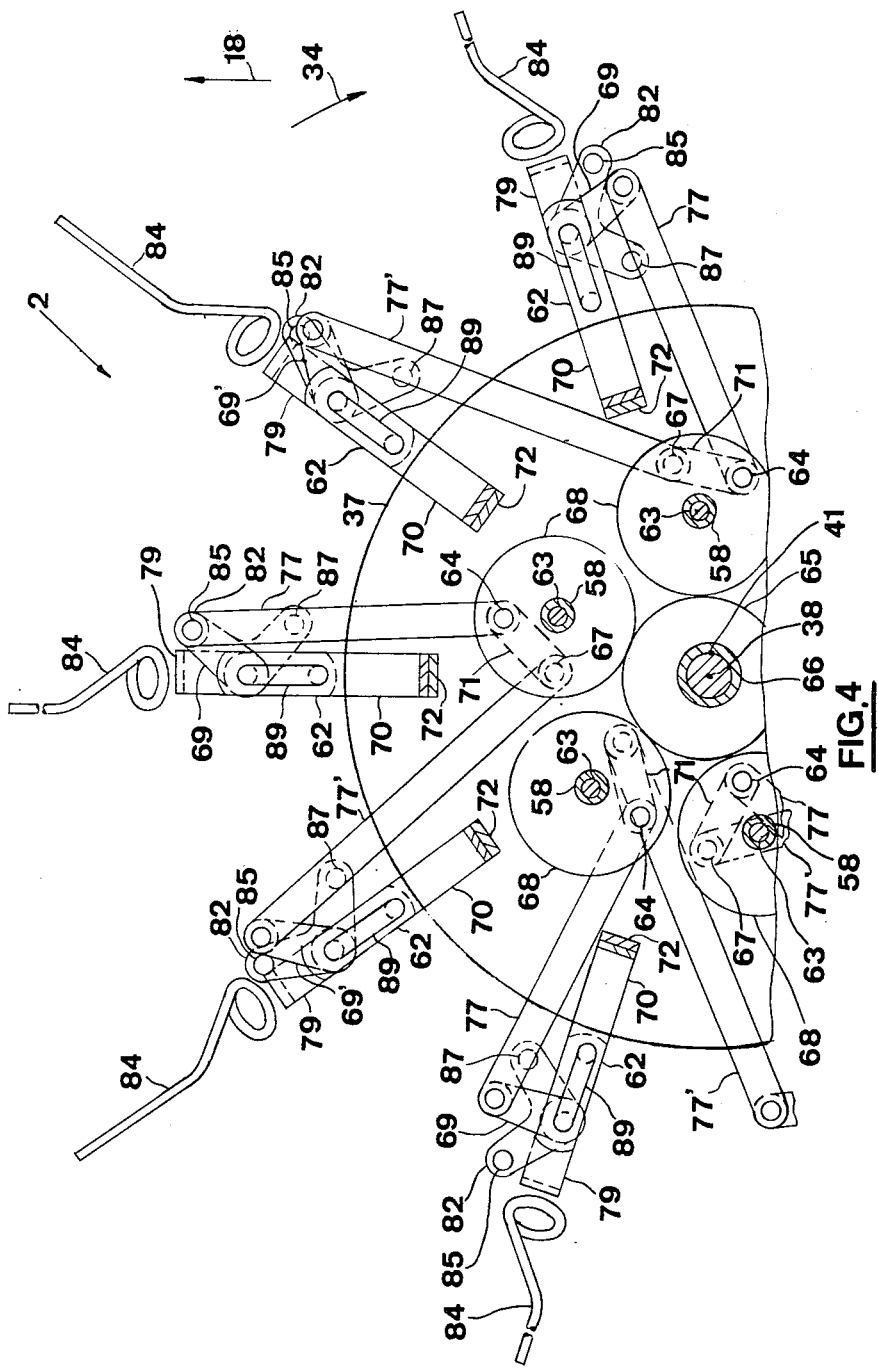
FIGS. 4 and 5 are views similar to FIG. 3 but showing the rotor assembly in other characterising operating conditions.
Figure 7:
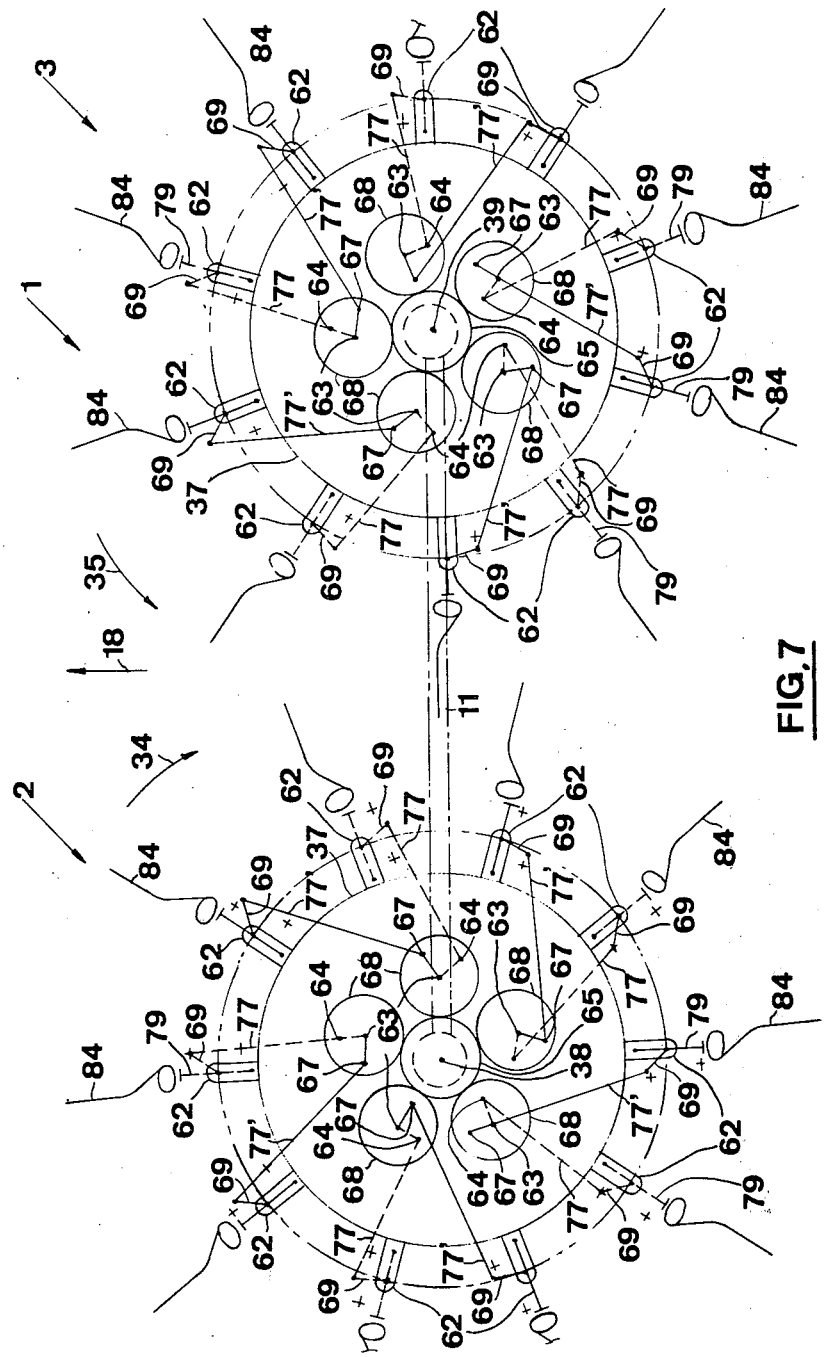
FIG. 7 is a view similar to FIG. 6 but showing the rotor assemblies in the operating condition of FIG. 4.

In the positions shown in FIGS. 2, 4 and 7, the spring tines 95, 96 are directed generally radially outwardly relative to the centres of the rotor assemblies 2, 3 and when seen in the direction of the rotational axes 38, 39 of the assemblies 2, 3. Also as seen in that direction, the respective tines 95, 96 are positioned the one vertically above the other. As seen in side elevation, upper portions 99, 100 of the spring tines 95, 96 define an angle of about 45° with the horizontal (see FIG. 2). The lower end 101 of the lower spring tine 95 of each tine assembly assumes a much flatter inclination relative to the ground, for example, of the order of 10°. The lower end 102 of the upper spring leg 96 of each tine assembly is generally parallel to the ground. It is further desirable to have the lower end 102 of adjacent upper spring tines 96 at different levels above the ground surface. To this end, the upper portion 100 of each alternate spring tine 96 is substantially shorter than the upper portion 100 of each other upper spring tine 96. The portion of these raised lower ends is schematically shown at 102' in FIG. 2. It will also be noted that, as seen in the direction of the axes 38, 39 of the rotor assemblies 2, 3, the extreme ends of the spring tines 95, 96 are positioned substantially vertically above each other, i.e. these ends are at substantially equal distances from the centre of the respective rotor assemblies.

The spring tines of the type above can resiliently flex in the direction of the windings of the spring coils as well as in a direction opposite thereto.

OPERATION

When required for use, the rake-tedder 1 is attached to the three point hitch of a pulling tractor via its U-shaped yoke 5 and pulled across the field with its wheels 52 running on the ground surface. The rotor assemblies 2, 3 are brought in an offset position relative to the tractor by means of the lateral positioning link 13. Dependent on the operation that is desired, the rotor assemblies 2, 3 should also be staggered in a fore-and-aft direction or be positioned side-by-side relative to the forward direction of operative travel 18. This adjustment may be accomplished by means of the further adjusting link 17.

Also dependent on the operation that is desired, the rotor assemblies 2, 3 should have their rotary axes 38, 39 almost vertical or tipped forwardly over a substantial angle. To position the rotary axes 38, 39 generally vertically, the wheels 52 are brought closer to the rotor assemblies 2, 3 on the one hand, whilst on the other hand, the top link of the three point tractor hitch is adjusted in length so as to tip said axes in a rearward direction so that they approach the vertical position. Thus the rake tines 95 are moved with their extreme ends along paths which are relatively close, and substantially parallel to the ground surface. In practice it is often desired to have said paths at an angle of about 5° relative to the ground surface. In other working conditions, the rotor assemblies 2, 3 should be tipped forwardly over a predetermined angle so that the lower ends of the raking tines 95 move closely adjacent the ground surface at the forward ends of the rotor assemblies 2, 3 and at a distance above the ground surface at the rearward ends of the rotor assemblies. This is accomplished by lowering the wheels 52 relative to the rotor assemblies 2, 3 and by shortening the top link of the tractor three point hitch. Usually the inclination of the working paths is then in the range of 15° to 20°. This is generally conventional in the art and will not be discussed in any further detail.

The universal joint shaft 25 is coupled to the tractor PTO which is driven at a selected speed adapted to the operation to be performed by the rake-tedder. Basically the rake-tedder according to the invention may be used to accomplish two different types of functions, namely spreading or tedding on the one hand, and windrowing or swathing on the other hand. In practice, however, further functions are possible as is described and shown in U.S. Pat. No. 4,263,774.

When used as a windrow forming machine, the rotor assemblies 2, 3 are driven at a relatively low speed with the rotational axes 38, 39 extending generally vertically or inclined forwardly over a small angle of no more than about 5° relative to the vertical. Central delivery or side delivery windrowing can be effected. The former type of operation is the most common and the most practical if crops with a good yield are being handled. Under these circumstances a single, centrally formed windrow is sufficient fully to load a haler during the subsequent baling operation. For this type of operation, the transverse beam 11 is positioned generally perpendicular to the intended direction of operative travel and the rotor assemblies 2, 3 and rotated in opposite directions 34, 35 toward each other at their forward ends.

The most important setting for accomplishing this function is the proper setting of the rake tines 95, 96 relative to the rotor assemblies 2, 3. Therefore, this will now be described in greater detail. The latch members 89 are lifted to the extent that the shorter legs 90' thereof are fully retracted from any latch position and may swing about the pivot axes 91. The tine carriers 79 with the angled members 82 thereon are then pivoted about the pivot axes 91 so that the apertures 87 in the angled members 82 are aligned with the bushes 88, whereafter the latch members 89 are lowered and the shorter legs 90' thereof inserted in the aligned apertures 87 and bushes 88, thus coupling the tine carriers 79 in a specific position relative to the linkages 69, 69'. As the linkages 69, 69' all assume different positions relative to the rotor assemblies 2 and 3 due to the fact that they are coupled to the planetary gears 68 via the connecting rods 77 nd 77', the tine carriers 79 and the tine structures 84 thereon also will assume different positions.

As the carrier plates 37 are rotated in the directions 34, 35 around the supporting shafts 41, the planetary gears 68 are caused to roll over the stationary central gear 65 in the directions 34, 35, respectively, around their own axes. As both the planetary gears 68 and the central gear 65 have the same number of gear teeth, the gears 68 make one revolution around their own axes as the carrier plates 37 make one revolution around the shafts 41. As a result, the tine carriers 79 are caused to pivot around their respective pivot axes 91 in the bearing bushes 75 of the arms 62 since the connecting rods 77 and 77' couple the carriers 79 to the gears 68 in the manner explained above.

The distance D1 between the pivot axes 91 and the bushes 88 is selected to be somewhat longer than the distance D2 between the respective stub shafts, on the one hand, and the pivotal mountings 63 of the planetary gears 68, on the other hand. Thus a full revolution of the planetary gears 68 will pivot the associated tine carriers 79 back and forth over an angle of less than 180°. Preferably the proportions of the components defined above are such that the tine carriers swing over an angle of 90° (or just slightly greater, i.e. 100°). In one arrangement which has been tried successfully, the ratio D1:D2 was 55:70. The tines 95, 96 are so mounted on the respective tine carriers 79 that in one extreme position of the carriers the tines extend generally radially outwardly from the respective rotor assemblies 2, 3 when seen in the direction of the rotational axes 38, 39. This means that the tines 95, 96, as seen in that direction, move to a position generally tangential to the direction of rotation of the rotor assemblies 2, 3 when the tine carriers 79 approach their other extreme position. In the event that the tine carriers 79 pivot over an angle of more than 90°, then the tines 95, 96 move beyond that generally tangential position and thus retract even further. The arrangement is further such that, when the tines 95, 96 approach their tangential position, they trail with respect to the direction of rotation 34, 35 of the respective rotor assemblies 2, 3. In operation, the tines 95, 96 move gradually from one extreme position to the other extreme position and vice versa so that they are directed substantially transverse to the direction of rotation during about one half of the revolution of the rotor assemblies 2, 3, whilst during the other half of the revolution of the rotor assemblies they are positioned generally tangential relative to the direction of rotation of the rotor assemblies or close to said generally tangential direction. In the former half of the operating cycle, the tines 95, 96 engage crop material lying on the ground and sweep it across the ground in the direction of rotation of the respective rotor assemblies 2, 3. In the latter half of the operating cycle, and as the tines 95, 96 swing backward relative to the direction of rotation of the rotor assemblies and towards the above defined tangential positions, crop material engaged by the tines 95, 96 is released and dropped onto the ground.

In view of the foregoing explanation, one might assume that the planetary gears 68 with the stub shafts 64 and 67 thereon and the tine carriers 79 should be adjusted so that the tines 95, 96 reach their most retracted position at the point where the rotor assemblies 2, 3 face each other since at this point the windrow should be formed. In practice, it has been found that this is not so. Instead, the point of maximum retraction of the tines 95, 96 should be positioned substantially beyond the facing points of the rotor assemblies as seen in the directions of rotation 34, 35. Preferably this angular offset of the points of maximum retraction of the tines 95, 96 relative to the facing points of the rotor assemblies is in the range of 45° to 90°. The explanation of this preference is that beyond the point of maximum retraction, the tines 95, 96 start moving outwardly again so that if the above discussed angular offsetting of the point of maximum retraction were not provided, the tines 95, 96 would tend to re-engage a certain amount of crop material and scatter it in a random fashion. This, of course, is contrary to what is desired. Therefore, and to avoid this incorrect operation, the tines 95, 96 should start moving outwardly again at a much later point in the cycle. The above described problem is also partially overcome by the fact that the tine carriers 79 swing over more than 90°, whereby the most retracted position is even beyond the position which is tangential to the direction of rotation. Thus the tines 95, 96 are in a crop releasing position over a larger portion of the cycle. Angular adjustment of the point of maximum retraction of the tine structures 84 is made possible by the provision of the latch means 53 and the pivotal mounting of the central gear 65 on the support shaft 41. To make such an adjustment, the latch pin 56 is retracted from the latch hole 59 in the central gear 65, whereafter the central gear 65, which during operation is kept stationary, is rotated about the support shaft 41 so as to adjust the point of maximum retraction of the tine structures 84.

With the above described arrangement a clean windrow can be formed without having to install windrow forming deflectors, for example, at a location rearwardly of the crop delivery area of the rotor assemblies. Of course, if windrow forming deflectors were added, this would not harm the operation but they are not essential.

It will also be noted that with the above described setting, the rotor assemblies 2, 3 need not be adjustably mounted relative to each other because sufficient free space is available between the assemblies to deposit therebetween a normal windrow having regard to the manner in which tine retraction is accomplished.

When the crop material has a small yield, it may be desirable to place two windrows together. To accomplish this, the rotor assemblies 2, 3 should be staggered relative to each other in the intended direction of operative travel 18 and they should be driven in the one and the same direction. In the arrangement shown in FIG. 8, the left-hand rotor assembly 2 is positioned further rearwardly than the right-hand assembly 3. The drive direction of the left-hand assembly 2 is reversed by means of the reversing mechanism 33 and is now in the direction 36. A first windrow is made when the machine is moved in one direction across the field and a further windrow is placed on top of the first windrow as the machine is pulled in the opposite direction across the field and alongside the first windrow. Thus, crop material spread over twice the width of the machine is raked together in a single windrow.

Figure 5:
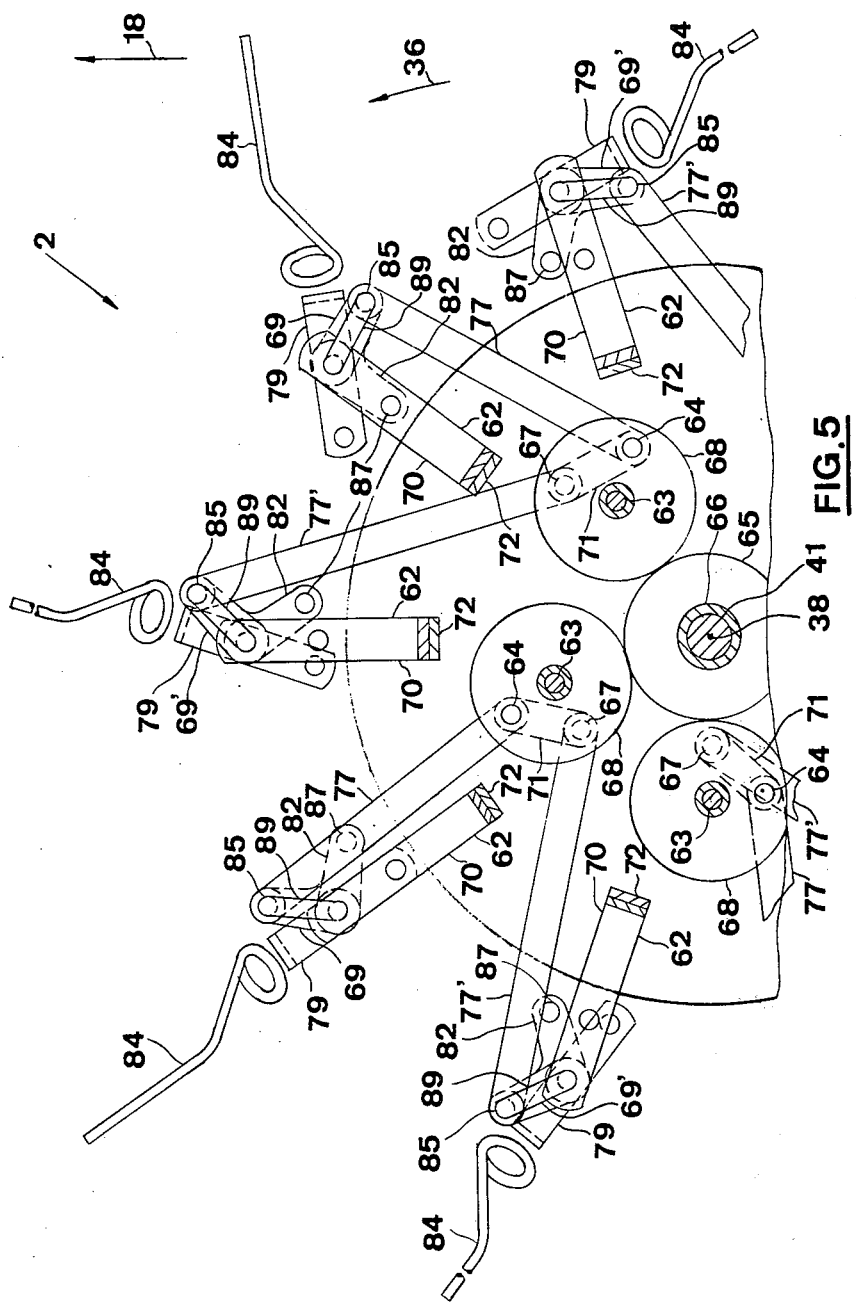
Figure 6:
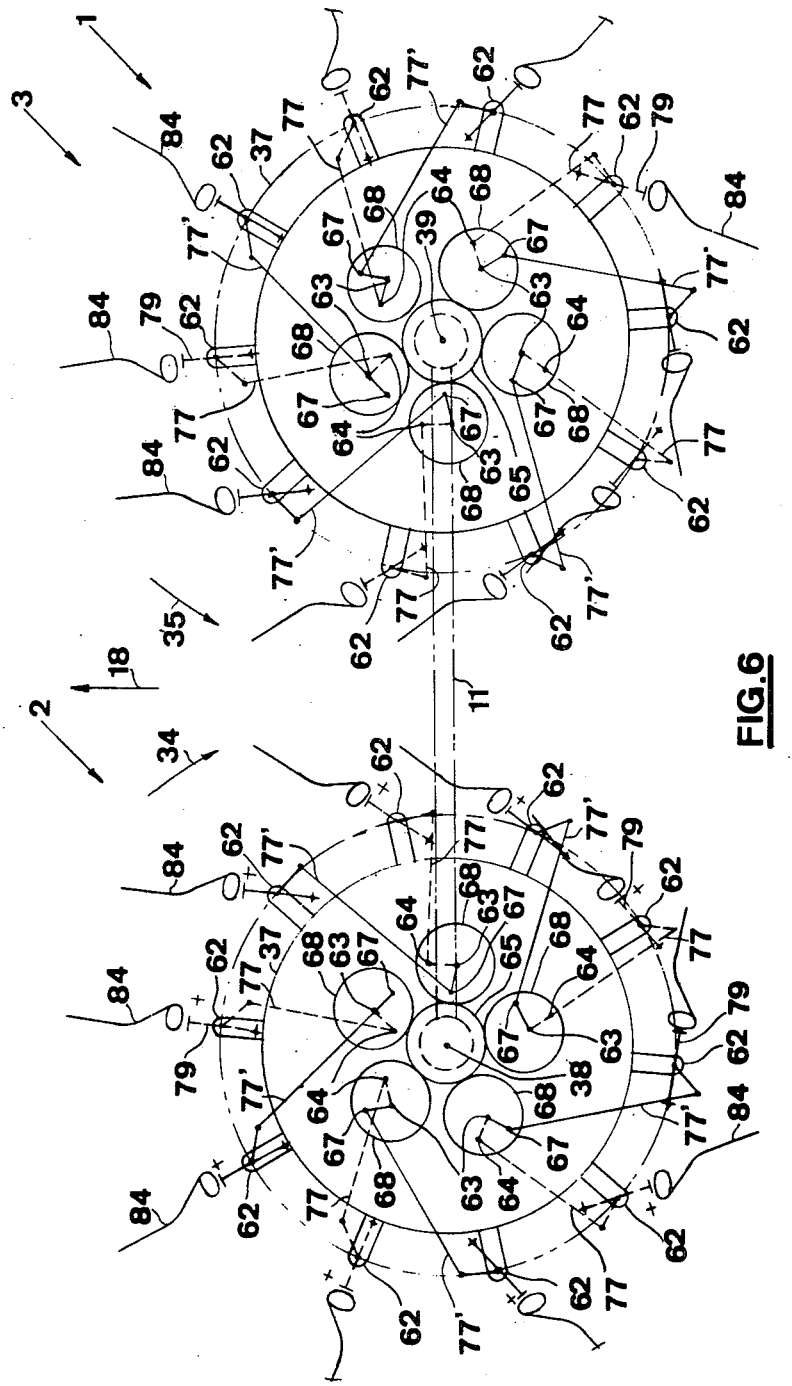
FIG. 6 is a schematic top view illustrating both rotor assemblies of the machine of FIG. 1 with the rotor assemblies in the characterising operating condition as shown in FIG. 3.
Figure 8:
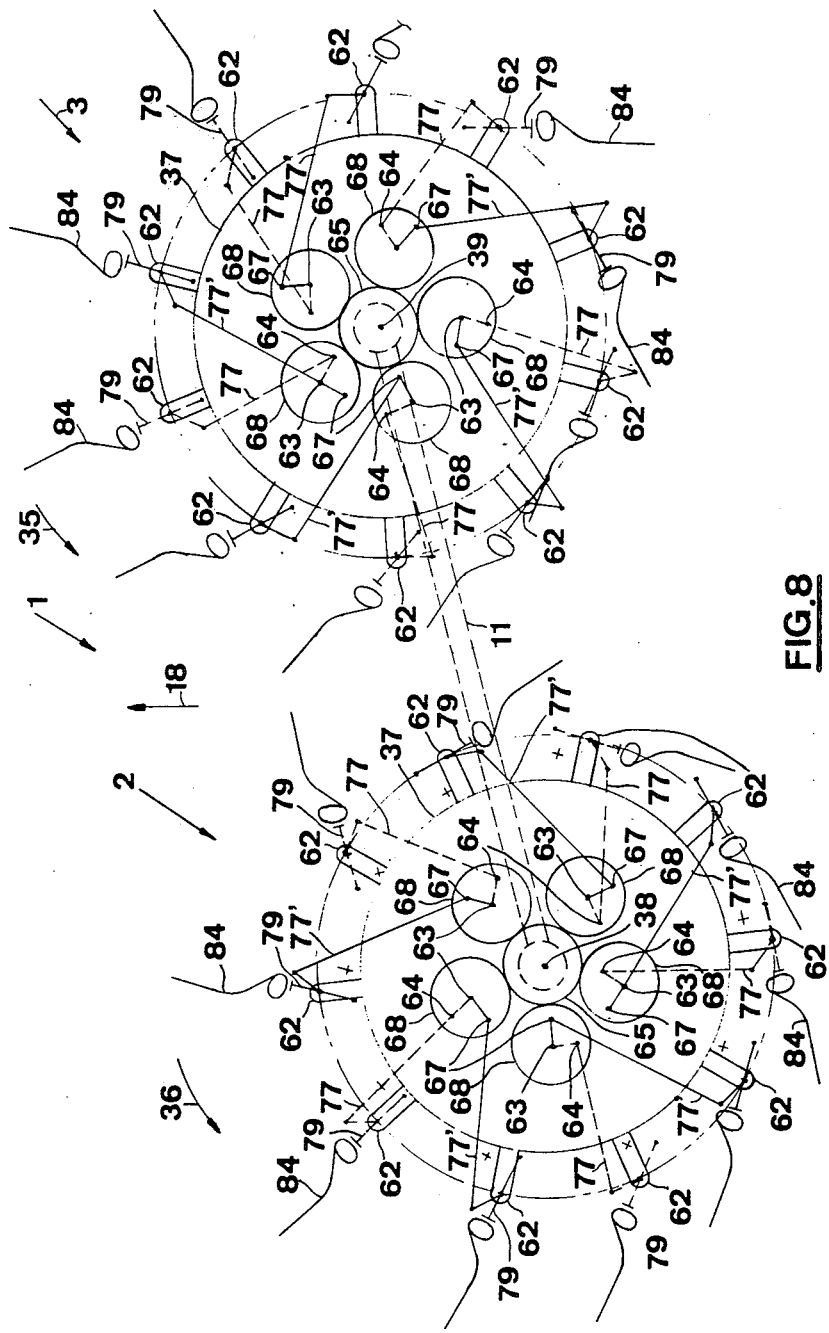
FIG. 8 is a view similar to FIG. 6 but showing the rotor assemblies in the operating condition of FIG. 5.

The machine setting for this operation is further illustrated in FIGS. 5 and 8. The transverse beam 11 is positioned at an angle of 105° relative to the intended direction of operative travel 18. The right-hand rotor assembly 3 is adjusted in exactly the same way as it was adjusted for central windrow formation. Thus the tines 95, 96 move from an extreme position, in which they are directed substantially radially outwardly, to a further extreme position in which they are fully retracted in a position substantially tangential to the direction of rotation or even somewhat beyond that tangential position. The point of maximum retraction is again between about 45° to 90° beyond the facing points of the rotor assemblies 23.

The left-hand rotor assembly 2 has to be reset to a certain degree. The linkages 69, 69' should now be coupled to the respective tine carriers 79 in a manner such that the apertures 85, instead of the apertures 87, of the angled members 82 are aligned with the bushes 88 of the linkages 69, 69'. The latch members 89 are now positioned so that the shorter legs 90' thereof coincide with the bushes 88 and the apertures 85, whereby the tine carriers 79 are linked to the linkages 69, 69' in the new position. In this new position, the tine structures 84 have been pivoted about the pivot axes 91 over an angle of about 90° (or slightly more). Simultaneously, the central gear 65 of the left-hand rotor assembly 2 has to be rotated over an angle of about 180° and latched in this position by means of the latch structure 53.

As a result of this resetting, the tines 95, 96 retract in a direction which is opposite to the direction of retraction when the assembly is adjusted for central windrowing. Thus the tines 95, 96 again retract in a trailing fashion relative to the direction of rotation 36 so that crop material engaged thereby is released on retraction. Also, the raking tines 95, 96 again move from a first extreme position in which they extend generally radially outwardly (as seen in the direction of the rotational axis 38) to another extreme position in which they are retracted to the maximum and extend substantially tangentially to the direction of rotation 36. More precisely, the lower ends of the tines 95, 96 take this substantially tangential position. The point of maximum retraction is between about 225° and 270° beyond the point of the rotor assembly 2 closest to the assembly 3.

In operation, crop material lying in front of the right-hand rotor assembly 3 is engaged by the tines 95, 96 thereof, swept in a transverse direction to the left, and released in front of the tines 95, 96 of the left-hand side rotor assembly 2. Thus the left-hand assembly 2 takes over from the right-hand assembly 3 and engages that crop material and any other already in its path and moves it to the left and deposits it in a singl windrow. Because of the angular offset of the point of maximum retraction of the tines 95, 96 of the left-hand assembly 2, as explained above, no crop material will be carried along behind that assembly.

It will be noted that the side delivered windrow is formed without having to install a windrow forming deflector board. Again, if such a board were installed it would not detract from the operation of the machine but it is not essential as it is in some known machines. Also it will be noted that it is not necessary to bring the rotor assemblies 2, 3 closer together. Indeed, the gap between the tines 95, 96 of the adjacent assemblies which existed when the machine was adjusted for central windrow formation, substantially disappears upon setting the machine for side delivery.

For spreading or tedding crop material, another machine setting is required. The rotor assemblies 2, 3 are rotated in opposite directions 34, 35 as before and thus deliver crop material centrally. The rotational speed of the assemblies 2, 3, however, should preferably be higher than when windrows are formed. The transverse beam 11 should again be positioned generally perpendicular to the intended direction of operative travel 18 and furthermore the assemblies 2, 3 should be tipped in a forward direction so that in their rearward positions, the tines 95, 96 have their lower ends at a considerable height above ground level, whilst in their forward positions the rotor lower ends move closely above the ground surface so as to grasp crop material lying thereon. To this end, and as already explained, the wheels 52 are lowered with respect to the assemblies 2, 3 and the top link of the tractor three point hitching system is shortened.

The most important setting, however, is again the setting of the tines 95, 96 and this will be described hereinafter. The above outlined working condition can be used for spreading crop material after it has been cut and deposited in swaths by a mower. In this operating condition, the machine is pulled across the field with the rotor assemblies 2, 3 aligned with respective swaths. The same machine setting is also used for tedding crop material which has been spread previously.

The tine setting for the spreading condition will now be described in greater detail with particular reference to FIGS. 4 and 7. It has been experienced, and is generally known in the art, that under most conditions, the best spreading results are obtained when the tines 95, 96 remain in a generally radially outwardly extending position during the entire cycle thereof. In other words, the tines 95, 96 should not retract. To this end the tine carriers 79 are disconnected from the linkages 69 and pivoted about their respective pivot axes 91 until the apertures 78 in the extensions of the horizontal portions 86 of the tine carriers 79 are aligned with the apertures 80 in the arms 62. The tine carriers 79 with the tine structures 84 thereon are then latched in these positions by inserting the shorter legs 90' of the latch members 89 in the aligned apertures 78 and 80. Having done this, the tine structures 84 assume fixed positions relative to the rotor assemblies 2 and 3, wherein the tines 95, 96 extend generally radially outwardly when seen in the direction of the axes 38, 39. Also, the linkages 69, 69', which still remain coupled to the connecting rods 77 and 77' continue to be motion controlled and to this end can freely pivot about the pivot axis 91 without influencing in any way the position of the tine structures 84.

In operation the radially outwardly extending tines 95, 96 grasp crop material lying on the ground in front of the respective rotor assemblies 2, 3 and carry it along towards the centre of the machine whilst gradually lifting the crop material from the ground. As a result of the increased rotational velocity of the tines 95, 96, the crop material tends to slip off the tines under the influence of centrifugal forces, whereby it is spread more or less evenly over substantially the full width of the machine at the rear thereof.

It will be appreciated that to effect spreading with the machine presently under consideration it is not necessary to bring the rotor assemblies 2, 9 closer to each other as is the case in certain prior art arrangements. Indeed, in the spreading condition the tines 95, 96 extend radially outwardly to an extent that they fully cover the gap between the adjacent rotor assemblies and even have overlapping working paths.

It may happen that windrowed crop material which is brittle has, for some reason, to be spread again. Spreading this crop material with the machine in the normal spreading condition may cause unacceptable leaf losses. In these circumstances the crop windrows may be spread with a machine which basically is set in the windrowing condition, but with the following important difference, namely that the offsetting of the point of maximum retraction of the raking tines 95, 96 as defined above is less than 45°. To this end the central gear 65 is angularly adjustable around the supporting shaft 41. The spreading action with this machine setting will be more gentle mainly because of the reduced rotational speed of the rotor assemblies 2, 3 and thus less losses will occur. Under these conditions it may happen that the crop is spread over a width which is somewhat less than the full width of the machine because of the more gentle operation.

ALTERNATIVES

Turning now to FIGS. 12 and 13, another embodiment of the invention will now be described. Similar components are indicated by identical reference numerals and it should be noted that FIGS. 12 and 13 illustrate part of the left-hand rotor assembly 2. Two different types of tine carriers 79 are provided in alternating fashion around the respective rotor assemblies 2, 3. Only one type of tine carrier is shown in FIGS. 12 and 13 but reference is made to U.S. Pat. No. 4,263,774, for a description of the other type. The tine carriers 79 are welded to bushes 120 which themselves are rotatably mounted in bushes 119 on the arm 62, on the one hand, and which, on the other hand, rotatably support pivot pins 118. The horizontal portions 86 of the tine carriers 79 comprise a locking aperture 121 which can be aligned with a locking aperture 122 in the associated arms 62. A latch or locking pin 123 can be inserted in a pair of locking apertures 121 and 122 when they are aligned with each other. Thus the tine carriers 79 assume a fixed position relative to the respective arms 62.

Welded to each pivot pin 118 is a crank 124 which also comprises a locking aperture 125 and which can be aligned with the locking aperture 121 in the corresponding tine carrier 79. The locking pins 123 can be removed from the respective apertures 121 and 122 and inserted in the locking apertures 125 and 121 so as to lock the cranks 124 with the tine carriers instead of locking the arms 62 with the latter. Thus the tine carriers 79 can now pivot relative to the arms 62.

Each crank 124 of the right-hand rotor assembly 3 comprises a single further aperture 126 for pivotally receiving the pivot pin 127 of the associated connecting rod 77. Each crank 124 of the left-hand rotor assembly 2 comprises a pair of spaced apertures 126, 128 for pivotally receiving the pivot pins 127 of the associated connecting rods 77 in one or other of the apertures as required.

In this embodiment, the carrier plates 37 are of a different slope and the cranks 71 are connected at one end to the associated planetary gear by members 130 and at the other end are pivotally connected to the connecting rods 77 by pivot pins 131.

In the arrangement shown in FIG. 12, the components are adjusted for spreading or tedding action. This means that all tine structures 84 (not shown) are oriented generally radially outwardly when seen in the direction of the axes 38, 39. As already mentioned, in this position the tine carriers 79 are firmly coupled to the respective arms 62 by means of the locking pins 123 which are inserted through the locking apertures 121, 122. In this condition, the pivot pins 118 are freely pivotable in the bushes 120 of the tine carriers 79 and rotation of the carrier plates 37 results in the gears 68 rotating about their respective axes and the crank means 124 pivoting about the pivot pins 118 via the connecting rods 77. This has no effect, however, on the position of the tine structures 84.

To change the machine to a central delivery windrowing condition, the only adjustment required of the rotor assemblies 2, 3 is the following: the locking pins 123 have to be removed from the locking apertures 121, 122 and inserted in the locking apertures 125, 121 so as to couple the tine carriers 79 to the cranks 124 and render them freely pivotable relative to the arms 62. Thus, there is no requirement for the connecting rods 77 to be detached and re-connected.

In order to change the machine from a central delivery windrowing condition to a side delivery windrowing condition, the connecting rods 77 of only the left-hand side rotor assembly 2, 3 should be disconnected at one end from the cranks 124 and re-coupled thereto at the location of the further apertures 128 so that in operation the tine carriers 79 pivot in an opposite direction around the pivot pins 118. This position of the connecting rods is shown in full lines in FIG. 13 with the former position being shown in broken lines at 77".

Figure 14:
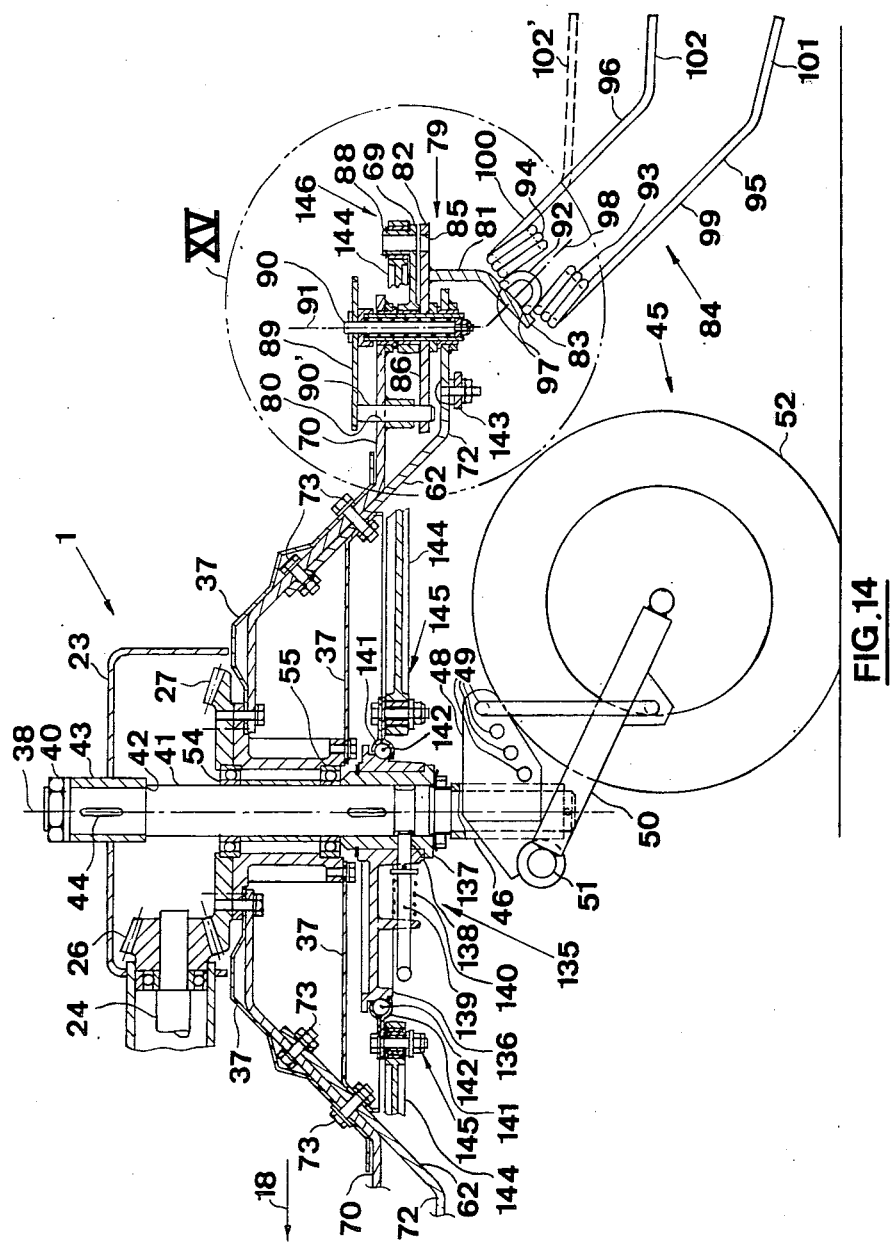
FIG. 14 is a view similar to that of FIG. 2 but illustrating a further embodiment.
Figure 15:
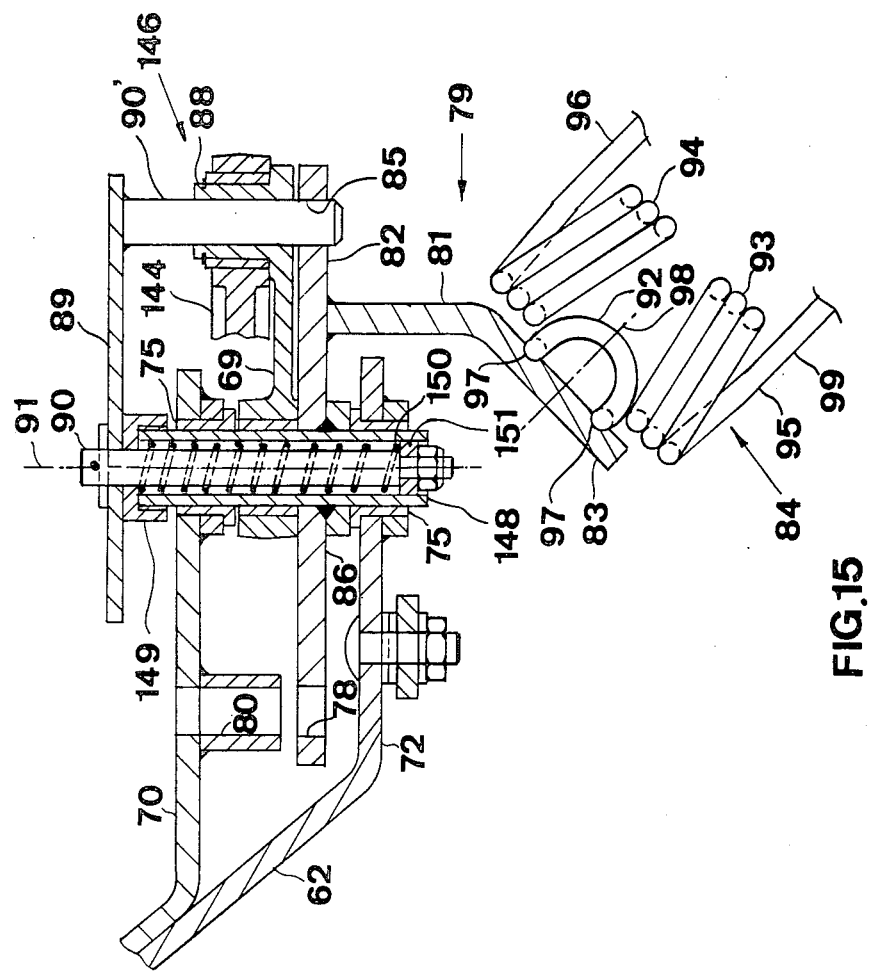
FIG. 15 is an enlargement of the portion XV of FIG. 14.

Turning now to FIGS. 14 and 15, these illustrate a preferred embodiment of the present invention and again, similar components carry identical reference numerals. The main difference between this embodiment and that of FIGS. 1 to 11 is that the previous control means for the tine structures 84 comprising the planetary gears 68 have been replaced by eccentric position control means indicated generally at 135. The control means 135 comprise a circular disc 136 mounted eccentrically, and angularly adjustably, on a bush 137 which is keyed on the shaft 41. The bush 137 comprises a plurality of apertures 138. A latch pin 139 on the disc 136 can cooperate with any of the latch apertures 138. Spring means 140 urge the pin 139 into engagement with the selected aperture 138.

A position control ring 141 is rotatably mounted via rollers 142 on the disc 136. This ring 141 is coupled to the associated rotor assembly 2, 3 in a manner, now shown in detail except for the section indicated at 143, so that the ring is caused to rotate in unison with rotor assembly about the periphery of the disc 136.

Connecting rods 144, somewhat similar to the rods 77 and 77' of the embodiment of FIGS. 2 to 11, are pivotally coupled at one end 145 to the position control ring 136 and at the other end 146 to the linkages 69, 69'. One connecting rod 144 is provided for each tine structure 84.

The pivotal coupling between the connecting rods 144 and the respective tine assemblies is similar to that of the embodiment of FIGS. 1 to 11 and comprise the linkages 69, 69' and the latch members 89. The horizontal portion 86 of each tine carrier 79 is welded on a hollow shaft 148 which is rotatably mounted on the members 70 and 72 of the associated rotor assembly 2,3, via the bushes 75. Also rotatably mounted on the hollow shaft 148 between the members 70 and 72 (above the horizontal portion 86) is the linkage 69, 69'. At its other end, the linkage 69, 69' is provided with the bush 88 upon which one end of the associated connecting rod 144 is pivotally mounted.

The horizontal portion 86 of the tine carrier 79 again comprises the angularly spaced apertures 78, 85 and 87 at equal radial distances from the pivot axes 91. A further aperture 80 in the member 70 is positioned so that the aperture 78 in the tine carrier 79 can be aligned therewith. The bush 88 on the linkage 69, 69', equally can be aligned with the apertures 85, 87.

The latch member 89 again comprises a first and longer leg 90 positioned coaxially with the hollow shaft 148 of the tine carrier 79. A stop 149 is screwed on the top of the hollow shaft 148 against which one end of a coil spring 150 abuts. The spring 150 abuts at its other end against a stop 151 on the longer leg 90 which is slidable axially within the hollow shaft 148. When the latch member 89 is raised to lift the shorter leg 90' out of engagement with any of the latched components, the coil spring 150 is compressed. Thus the coil spring 150 urges the latch member 89 back to its latching position and when in the latter, prevents the latch member jumping out.

As in the embodiment of FIGS. 1 to 11, the shorter leg 90' of the latch member 89 can be positioned either to couple the tine carrier 79 to the rotor assembly 2, 3 or to the linkage 69, 69'.

From what precedes it will be appreciated that a universal haymaking machine is provided comprising a minimum of components and capable of performing all haymaking operations between the mowing and the baling operations. The rake-tedder according to the present invention is simple in design and reliable in operation with excellent raking characteristics as well as excellent tedding characteristics. Furthermore, a rake-tedder according to the present invention is exempt of any cam and cam follower means in the form of cam rollers, whereby the fast wearing and relatively expensive components have been eliminated. Also rake-tedders according to the invention may be exempt of swath deflectors. To change the machine from its tedding position to its raking position and vice versa only a minimum of adjustments are required which are relatively simple and hence easily accomplished. Thus the risks for improper adjustments are reduced. Finally, the machine according to the invention is in all of its operating conditions a smooth running machine, whereby wear is reduced substantially and machine life thus increased.

Having thus described the invention, what is claimed is:

1. A haymaking machine comprising:
   a frame adapted for movement across a field;
   at least one rotor assembly rotatably supported by said frame about a first axis of rotation;
   a plurality of tine assemblies pivotally attached to said at least one rotor assembly;
   a linkage means mounted at one end coaxially with the pivotal mounting of each said tine assembly and pivotable relative to said tine assembly and said at least one rotor assembly, each said linkage means being selectively connectable in at least one operating condition to said corresponding tine assembly so as to be movable in unison therewith;
   an actuation means mounted on said at least one rotor assembly;
   a connecting means interconnecting said actuation means and each said linkage means, such that, in said at least one operating condition, said actuation means is operable to alternatively move said corresponding tine assembly between an extended crop engaging position and a retracted crop releasing position; and
   drive means for rotating said at least one rotor assembly.

2. The haymaking machine of claim 1 wherein said actuation means includes a disc member mounted on said at least one rotor assembly eccentrically of said first axis of rotation and is stationary during operation, said disc member having an outer peripheral edge, said actuation means further including a control ring rotatably mounted on said disc member for rotational movement around said peripheral edge in unison with the at least one rotor assembly, each said connecting means pivotally interconnecting said control ring and the corresponding said linkage means.

3. The haymaking machine of claim 2 wherein said disc member is angularly adjustable about said first axis of rotation, said actuation means further including latch means for securing said disc member in a preselected angular position.

4. The haymaking machine of claim 3 wherein said frame includes a support shaft defining said first axis of rotation, said disc member being mounted around said support shaft by a bush having a plurality of apertures therein, said disc member including a hole therein alignable with said plurality of apertures in said bush, said latch means including a spring loaded latch pin selectively cooperable with said hole, and any one of said plurality of apertures to effect the angular adjustment of said disc member.

5. The haymaking machine of claim 1 wherein said actuation means includes a central gear mounted on said at least one rotor assembly coaxially with said first axis of rotation, said central gear being stationary during operation of said at least one rotor assembly, said actuation means further including a plurality of planetary gears rotatably mounted on said at least one rotor assembly in an intermeshing relationship with said central gear, each said planetary gear having a second axis of rotation being spaced from said first axis of rotation and being rotatable in unison with said at least one rotor assembly.

6. The haymaking machine of claim 5 wherein each said connecting means is pivotally connected to a planetary gear eccentrically of said corresponding second axis of rotation.

7. The haymaking machine of claim 6 wherein said frame includes a support shaft defining said first axis of rotation, said central gear being angularly adjustably mounted around said support shaft, said at least one rotor assembly further including latch means for selectively locking said central gear in one of a plurality of preselected positions relative to said support shaft.

8. The haymaking machine of claim 6 wherein each said connecting means includes an elongated connecting rod pivotally connected to said corresponding planetary gear and to said corresponding linkage means, each said planetary gear being connected to a first tine assembly and a second tine assembly by first and second connecting rods, respectively.

9. The haymaking machine of claim 8 wherein each said planetary gear includes first and second stub shafts spaced from said corresponding second axis of rotation for pivotally attaching said first and second connecting rods, respectively, said first and second stub shafts being positioned at angularly offset locations relative to said corresponding second axis of rotation.

10. The haymaking machine of claim 8 wherein each said first connecting rod has a length greater than each corresponding said second connecting rod.

11. The haymaking machine of claim 6 wherein each said connecting means is pivotally attached to the corresponding said linkage means eccentrically of the pivotal connection between said corresponding tine assembly and said at least one rotor assembly.

12. The haymaking machine of claim 11 wherein the eccentricity of the pivotal connection of each said connecting means to said corresponding linkage means relative to aid corresponding pivotal connection of said tine assembly to said at least one rotor assembly is greater than the eccentricity of the pivotal mounting of the connecting means to the corresponding said planetary gear relative to said corresponding second axis of rotation.

13. The haymaking machine of claim 2 or 6 wherein each said tine assembly is disconnectable from the corresponding said linkage means, each said tine assembly being fixedly connectable to said at least one rotor assembly such that each said tine assembly can be selectively fixed in one position relative to said at least one rotor assembly and rotatable in unison therewith.

14. The haymaking machine of claim 2 or 6 wherein each said tine assembly trails its pivotal connection with said at least one rotor assembly relative to the direction of rotation thereof when said tine assembly is in any position other than said extended crop engaging position, said extended crop engaging position being in a plane projecting substantially radially from said first axis of rotation.

15. The haymaking machine of claim 2 or 6 further comprising at least one pair of rotor assemblies, each rotor assembly of said at least one pair being rotatable in the opposite direction from the other said rotor assembly of said at lest one pair.

16. The haymaking machine of claim 15 wherein one rotor assembly of said at least one pair includes a drive reversing means for selectively permitting both rotor assemblies of said at least one pair to rotate in the same direction.

17. The haymaking machine of claim 16 wherein each said linkage means on said rotor assembly having drive reversing means is connectable to the corresponding said tine assembly at at least two spaced apart positions along said linkage means.

18. The haymaking machine of claim 2 wherein each said connecting means is pivotally attached to the corresponding said linkage means eccentrically of the pivotal connection between said corresponding tine assembly and said at least one rotor assembly.

19. The haymaking machine of claim 5 wherein the central gear and the planetary gears in mesh therewith have equal numbers of gear teeth.

20. The haymaking machine of claim 5 wherein the tine assemblies and the planetary gears are spaced equiangularly around said at least one rotor aassembly.

21. The haymaking machine of claim 9 wherein the first and second stub shafts are provided at one side of the associated planetary gear; the first stub shaft being coupled directly to the associated planetary gear at one of its ends and supporting at its other end a crank to which is secured the second stub shaft.

22. The haymaking machine of claim 1 wherein each tine assembly includes a tine carrier pivotally mounted no said at least one rotor assembly coaxially with the pivotal mounting of the associated linkage means on said at least one rotor assembly and tine means supported on the tine carrier; the haymaking machine further comprising latch means associated with each tine carrier and associated linkage means for fixedly coupling the linkage means to the tine carrier in at least one position.

23. The haymaking machine of claim 22 wherein the latch means are capable of fixedly connecting the linkage means to the associated tine carrier in two positions which are angularly offset relative to each other.

24. The haymaking machine of claim 22 wherein each connecting means is pivotally attached to the associated linkage means via a hollow bush provided at a predetermined distance from the pivotal mounting of the linkage means on the at least one rotor assembly, the associated tine carrier including at least one aperture at the same distance from the pivotal mounting thereof on said at least one rotor assembly, whereby the hollow bush and a selected one of said at least one aperture in the tine carrier can be aligned by pivoting the tine carrier about its pivotal mounting, the latch means including a latch pin which can be inserted in the hollow bush and in said selected one aperture in the associated tine carrier aligned therewith, to couple the linkage means to the associated tine carrier.

25. The haymaking machine of claim 24 wherein each said tine carrier includes a further aperture alignable with an aperture in said at least one rotor assembly, said latch means being insertable in both of said apertures, when aligned, thus coupling the tine carrier in a fixed position to the at least one rotor assembly.

26. The haymaking machine of claim 25 wherein the further aperture in each tine carrier and the associated aperture in the at least one rotor assembly are provided at a distance from the pivot axis of the tine carrier and the associated linkage means on the at least one rotor assembly which is identical to the spacing of the bush on the linkage means and the other at least one aperture in the tine carrier relative to said pivot axis, the latch means further including a U-shaped structure having one leg coaxially mounted with said pivot axis and the other leg capable of being inserted in the hollow bush and the associated aperture in the at least one rotor assembly on the one hand, and any aperture of the other at least one aperture in the tine carrier on the other hand.

27. The haymaking machine of claim 26 wherein the leg of the latch means which is arranged coaxially with the pivot axis is longer tha the other leg, and wherein the latch means are shiftable in the direction of the pivot axis, the arrangement being such that the shorter leg can be fully retracted whilst the longer leg is still in position on the at least one rotor assembly, thus permitting the shorter leg to be pivoted about the pivot axis at the shorter leg is being retracted.

28. The haymaking machine of claim 25 wherein, when the tine carriers are latched in the fixed positions relative to the at least one rotor assembly, the tine means extend generally radially outwardly when seen in the direction of said first axis of rotation.

29. A haymaking machine comprising at least one pair of rotor assemblies, each rotor assembly of said at least one pair of rotor assemblies being rotatable in the opposite direction of the other rotor assembly of said at least one pair, drive reversing means associated with one rotor assembly of the at least one pair of rotor assemblies to selectively reverse the direction of rotation of said one rotor assembly, whereby the rotor assemblies of said at least one pair can be selectively rotated in the same direction, central gear means mounted coaxially with each rotor assembly and being stationary during operation, a plurality of planetary gears rotatably mounted on each rotor assembly in mesh with the central gear means thereof, a plurality of tine assemblies pivotally mounted on each rotor assembly eccentrically thereof, likage means coaxially mounted at one end with the pivotal mounting of the tine assemblies and pivotable relative to said tine assemblies and to said rotor assemblies, and connecting rods extending between the planetary gears eccentrically thereof and the linkage means, the linkage means of said one rotor assembly of said at least one pair being connectable to the respective tine assemblies in a first position and in a second position angularly offset relative to said first position, the central gear means of said one rotor assembly of said at least one pair also being adjustable between first and second positions angularly offset relative to each other, the arrangement being such that the tine assemblies move betewen extended, crop-engaging positions and retracted, crop-releasing positions which trail relative ot the respective directions of rotation of each of said rotor assemblies upon rotation thereof when said linkage means and said central gear means of said one rotor assembly of said at least one pair are adjusted in the first positions so that said rotor assemblies of said at least one pair are rotatable in opposing directions and when said linkage means and said central gear means of said one rotor assembly of said at least one pair are adjusted in the second positions so that said rotor assemblies of said at least one pair are rotatable in the same directions.

* * * * *